United States Patent
Paczkowski et al.

(10) Patent No.: US 9,363,090 B1
(45) Date of Patent: Jun. 7, 2016

(54) AUTHORIZATION OF COMMUNICATION LINKS BETWEEN END USER DEVICES USING INTERMEDIARY NODES

(71) Applicant: Sprint Communications Company L.P., Overland Park, KS (US)

(72) Inventors: Lyle Walter Paczkowski, Mission Hills, KS (US); Matthew C. Schlesener, Shawnee, KS (US); Carl Joseph Persson, Olathe, KS (US); William M. Parsel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 71 days.

(21) Appl. No.: 14/036,454

(22) Filed: Sep. 25, 2013

(51) Int. Cl.
*H04L 9/32* (2006.01)
*H04L 29/06* (2006.01)

(52) U.S. Cl.
CPC ............... *H04L 9/3273* (2013.01); *H04L 63/10* (2013.01)

(58) Field of Classification Search
CPC ........... H04L 63/0428–63/0478; H04L 9/3273
See application file for complete search history.

(56) References Cited

U.S. PATENT DOCUMENTS

2008/0282081 A1* 11/2008 Patiejunas .................... 713/153
2010/0313276 A1* 12/2010 Banti et al. ................... 726/28
2012/0089481 A1    4/2012 Iozzia et al.

OTHER PUBLICATIONS

"Creating and configuring ODRs;" WebSphere Virtual Enterprise Version 6.1, Preparing the hosting environment for dynamic operations; Sep. 25, 2013; pp. 1-5; http://pic.dhe.ibm.com/infocenter/wxdinfo/v6r1/index.jsp?topic=/com.ibm.websphere.ops.doc/info/odoe_task/todr.html.

* cited by examiner

*Primary Examiner* — Yin-Chen Shaw
*Assistant Examiner* — Arya Golriz

(57) ABSTRACT

Systems, methods, and software for operating communication systems are provided herein. In one example, method of operating a communication system to establish secure communications between a first user device communicating in a first communication network and a second user device communicating in a second communication network is presented. The method includes, responsive to a communication request received from the first user device, establishing a secure communication link between the first user device and a first security node. When a second security node has a security relationship established with the first security node, the method includes establishing the secure communication link for the secure communications between the first user device and the second user device using at least the security relationship between the first security node and the second security node, and exchanging the secure communications over the secure communication link.

10 Claims, 6 Drawing Sheets

AUTHORIZATION OF COMMUNICATION LINKS BETWEEN END USER DEVICES USING INTERMEDIARY NODES

TECHNICAL FIELD

Aspects of the disclosure are related to the field of communication systems, and in particular, authorization of a communication link between end user devices using intermediary nodes along the communication link path.

TECHNICAL BACKGROUND

Communication networks typically include routers, gateways, and various communication links which provide communication services to end user devices. For example, communication systems include access systems with equipment such as access nodes along with various intermediary nodes, such as control nodes, gateway nodes, and routing nodes, which provide communication access or routing services to end user devices over wired or wireless links. The access systems exchange user communications between end user devices, service providers, and other devices. The user communications typically include voice calls, data exchange, web pages, streaming media, or text messages, among other communication services.

Some end user devices or intermediary nodes can include partitioned security 'zones' in their associated processing systems. For example, a first zone can be employed to execute open or untrusted applications and obtain untrusted or unauthenticated data, and a second zone can be employed to execute trusted applications or obtain authenticated data. These security zones can be implemented on separate microprocessors, in separate cores of a multi-core microprocessor, or otherwise allocated over different processing portions of a wireless communication device or intermediary node.

Establishing secure and trusted communication links between end user devices, such as between wireless communication devices over different wireless communication networks, can be difficult to achieve. Moreover, some end user devices might not have similar security hardware or software that other end user devices have, such as the partitioned security 'zones' discussed above.

OVERVIEW

Systems, methods, and software for operating communication systems are provided herein. In one example, method of operating a communication system to establish secure communications between a first user device communicating in a first communication network and a second user device communicating in a second communication network is presented. The method includes, in a first security node of the first communication network, receiving a communication request from the first user device for the secure communications with the second user device, the first security node authorized to engage in the secure communications by an authorization node. Responsive to the communication request, the method includes establishing a secure communication link between the first user device and the first security node and determining if a second security node of the second communication network has a security relationship established with the first security node. When the second security node has the security relationship established with the first security node, the method includes establishing the secure communication link for the secure communications between the first user device and the second user device using at least the security relationship between the first security node and the second security node, and exchanging the secure communications over the secure communication link between the first user device and the second user device.

In another example, a communication system to establish secure communications between a first user device communicating in a first communication network and a second user device communicating in a second communication network is provided. The communication system includes a first security node of the first communication network configured to receive a communication request from the first user device for the secure communications with the second user device, the first security node authorized to engage in the secure communications by an authorization node. Responsive to the communication request, the first security node is configured to establish a secure communication link between the first user device and the first security node and determine if a second security node of the second communication network has a security relationship established with the first security node. When the second security node has the security relationship established with the first security node, the first security node is configured to establish the secure communication link for the secure communications between the first user device and the second user device using at least the security relationship between the first security node and the second security node. The first user device is configured to exchange the secure communications over the secure communication link with the second user device.

In another example, a communication system is provided. The communication system includes a first security node of a first communication network configured to receive a communication request from a first user device in the first communication network for secure communications with a second user device in a second communication network, the first security node authorized to engage in the secure communications by an authorization system. Responsive to the communication request, the first security node is configured to establish a secure communication link between the first user device and the first security node by at least determining that the first user device has been authorized by the authorization system to engage in the secure communications. The first security node is configured to determine if a second security node of the second communication network has a security relationship established with the first security node, the security relationship based in part on the second security node being authorized to engage in the secure communications by the authorization system. When the second security node has the security relationship established with the first security node, the first security node is configured to establish the secure communication link for the secure communications between the first user device and the second user device using at least the security relationship between the first security node and the second security node. The first user device is configured to exchange the secure communications over the secure communication link with the second user device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 is a system diagram illustrating a communication system.

DETAILED DESCRIPTION

Figure 1:
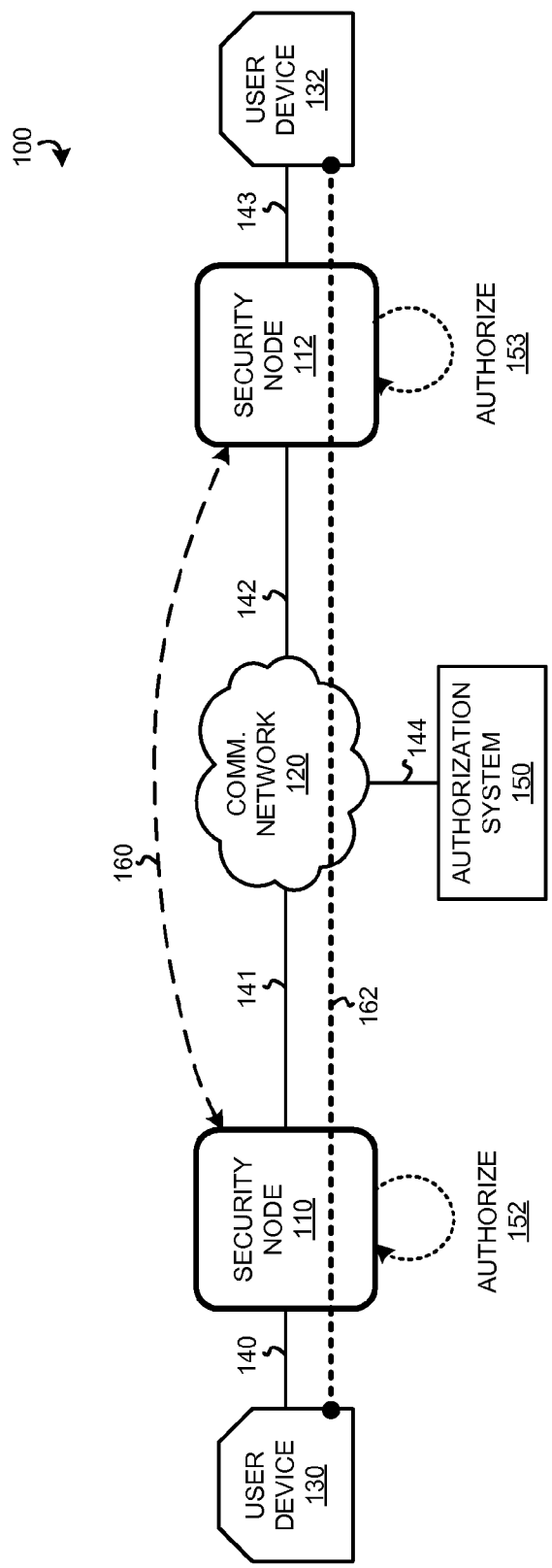

FIG. 1 is a system diagram illustrating communication system 100. Communication system 100 includes security nodes 110-112, communication network 120, end user devices 130-132, and authorization system 150. Security nodes 110 and 112 are intermediary nodes, such as gateway nodes, router nodes, proxy nodes, or other nodes used for routing or handling communications transferred over communication links. In typical examples, security node 110 is associated with a different communication system or communication network than security node 112. For example, security node 110 can be in a first wireless communication network operated by a first wireless network operator, while security node 112 can be in a second wireless communication network operated by a second wireless network operator different than the first wireless network operator.

User device 130 and security node 110 communicate over at least link 140. Security node 110 and communication network 120 communicate over link 141. Security node 112 and communication network 120 communicate over link 142. User device 132 and security node 112 communicate over at least link 143. Authorization system 150 and communication network 120 communicate over link 144.

In operation, user device 130 includes one or more communication transceivers which can communicate over one or more wireless or wired communication networks, such as over communication link 140. User device 130 desires to engage in secure communications with another user device, such as user device 132. Security node 110 and 112 can facilitate the secure communications by establishing a secure communication link using at least a trust relationship or security relationship established between security node 110 and security node 112.

Figure 2:
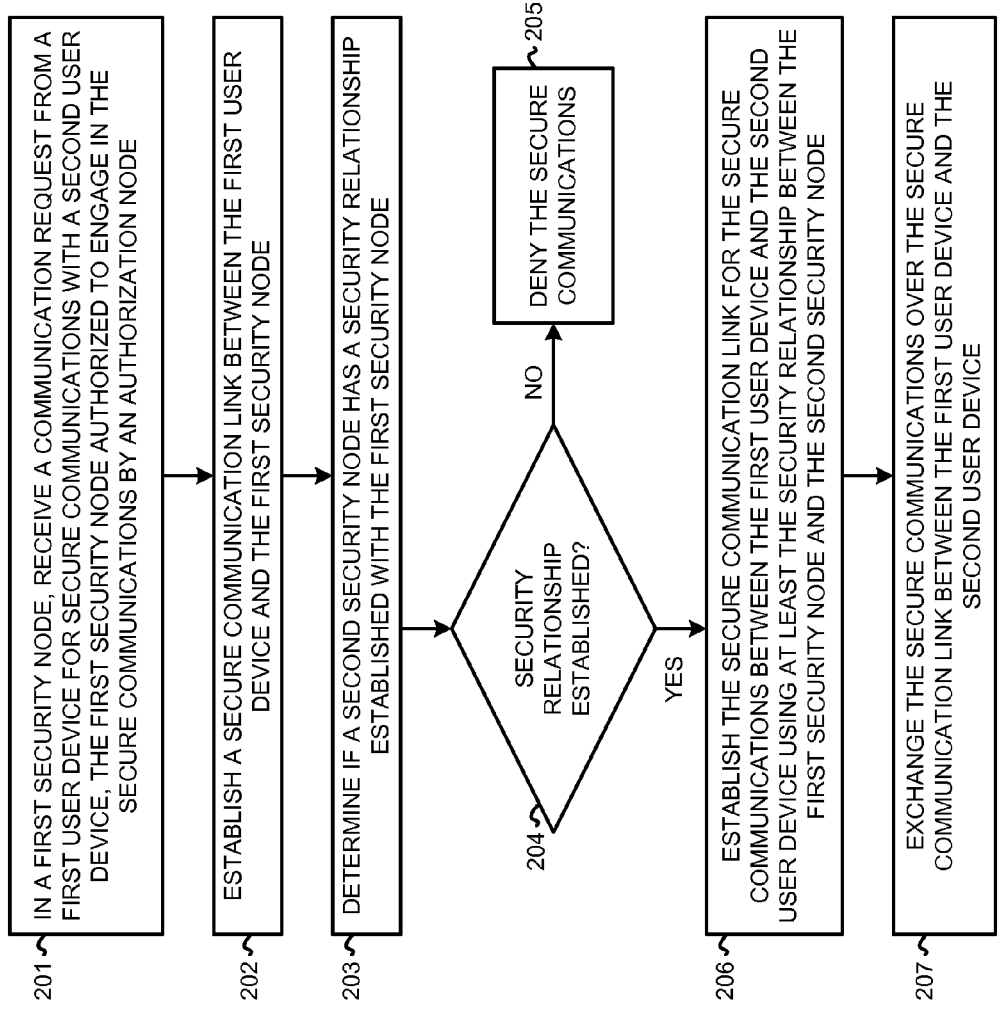
FIG. 2 is a flow diagram illustrating a method of operation of a communication system.

FIG. 2 is presented to illustrate an example operation of the elements of FIG. 1. FIG. 2 is a flow diagram illustrating a method of operation of communication system 100. The operations of FIG. 2 are referenced below parenthetically. In FIG. 2, a first security node receives (201) a communication request from a first user device for secure communications with a second user device, the first security node authorized to engage in the secure communications by an authorization node. The first security node in this example is security node 110 which receives the communication request transferred by user device 130 over at least link 140.

The communication request can include a request for secure communications that identifies user device 132 as the second user device, such as a destination device for a voice call, data session, text communication, or other communication request. In some examples, user device 130 receives a user request in an application for secure communications, and the communication request is responsively transferred by user device 130. The application is executed on user device 130, such as a voice call application, a packet voice call application, an audio or video conferencing application, or other voice call application. The communication request can be initiated by a user of user device 130 interacting with the application on user device 130, and the request is indicated or transferred to security node 110 or other communication nodes. The communication session can be requested to occur over communication network 120 to destination device 132, although other networks and destinations can be employed.

Security node 110 is authorized to engage in secure communications by an authorization node, such as authorization process 152 with authorization system 150 in FIG. 1. Authorization system 150 can authorize or authenticate a node or user device to partake in secure communications. In some examples, security node 110 includes one or more security keys which can be used to determine one or more hash results that are used in a security exchange with authorization system 150 during authorization process 152. Security node 110 can be authorized to engage in secure communications by authorization process 152 with authorization system 150 before the communication request is received, or can seek authorization responsive to the communication request.

Security node 110 establishes (202) a secure communication link between user device 130 and first security node 110. The secure communication link can include a portion of link 162 shown in FIG. 1, such as the portion over link 140. To establish the secure communication link between user device 130 and security node 110, security node 110 can allow user device 130 to inherit a security authorization of security node 110 and allow user device 130 to engage in secure communications due to the security authorization of security node 110. In other examples, user device 130 can perform an authorization process with authorization system 150. In some examples, user device 130 includes one or more security keys which can be used to determine one or more hash results that are used in a security exchange with authorization system 150 during authorization process 151. Once both user device 130 and security node 110 are authorized to engage in secure communications, the secure communication link can be established over link 140.

Security node 110 determines (203) if a second security node has a security relationship established with security node 110. In this example, the second security node is security node 112. Security relationship 160 can be established between security node 110 and security node 112. In some examples, security node 110 is authorized to engage in secure communications by authorization process 152 with authorization system 150. Security node 112 can also be authorized to engage in secure communications by an authorization node, such as by authorization system 150 in authorization process 153. Authorization processes 152 and 153 can create a security relationship between security node 110 and security node 112, represented by security relationship 160 in FIG. 1. This security relationship can allow security node 110 and security node 112 to be trusted to engage in secure communications over link 141, communication network 120, and link 142, among over other links and networks. This trust or security relationship can ensure that any communications transported through the trusted endpoints comprising security nodes 110 and 112 are also trusted and considered secure.

If the security relationship is not established between security node 110 and security node 112 (204), then security node 110 denies (205) the secure communications. The denial of the secure communications can be a message transferred to user device 130 responsive to the communication request. In other examples, the denial can include security node 110 establishing a non-secure communication link with security node 112.

If the security relationship is established between security node 110 and security node 112 (204), then security node 110 establishes (206) the secure communication link for the secure communications between user device 130 and user device 132 using at least the security relationship between security node 110 and security node 112. In this example, security relationship 160 is established between security node 110 and security node 112. Security node 110 or security node 112 can then trust communications with user device 132 without user device 132 going through an authorization process. Thus, secure communication link 162 can be established between user device 130 and user device 132.

Security relationship 160 comprises a previously established security exchange to allow for secure communications between security node 110 and security node 112. Based on at least security relationship 160, a secure communication link can be extended to an unsecure communication device, such as user device 132. Security relationship 160 can ensure that at least the identities of both security node 110 and security node 112 are verified by an authorization system, such as authorization system 150. In examples where security node 110 is in a first wireless communication network operated by a first wireless network operator and security node 112 is in a second wireless communication network operated by a second wireless network operator different than the first wireless network operator, security relationship 160 can ensure a trusted relationship for secure communications between different wireless communication networks or between different network operations, such as different wireless companies.

Security node 110 exchanges (207) the secure communications over secure communication link 162 between user device 130 and user device 132. In this example, security node 110 comprises a portion of secure communication link 162, and all devices, nodes, networks, and links in FIG. 1 that comprise secure communication link 162 can transport or carry the secure communications.

Figure 3:
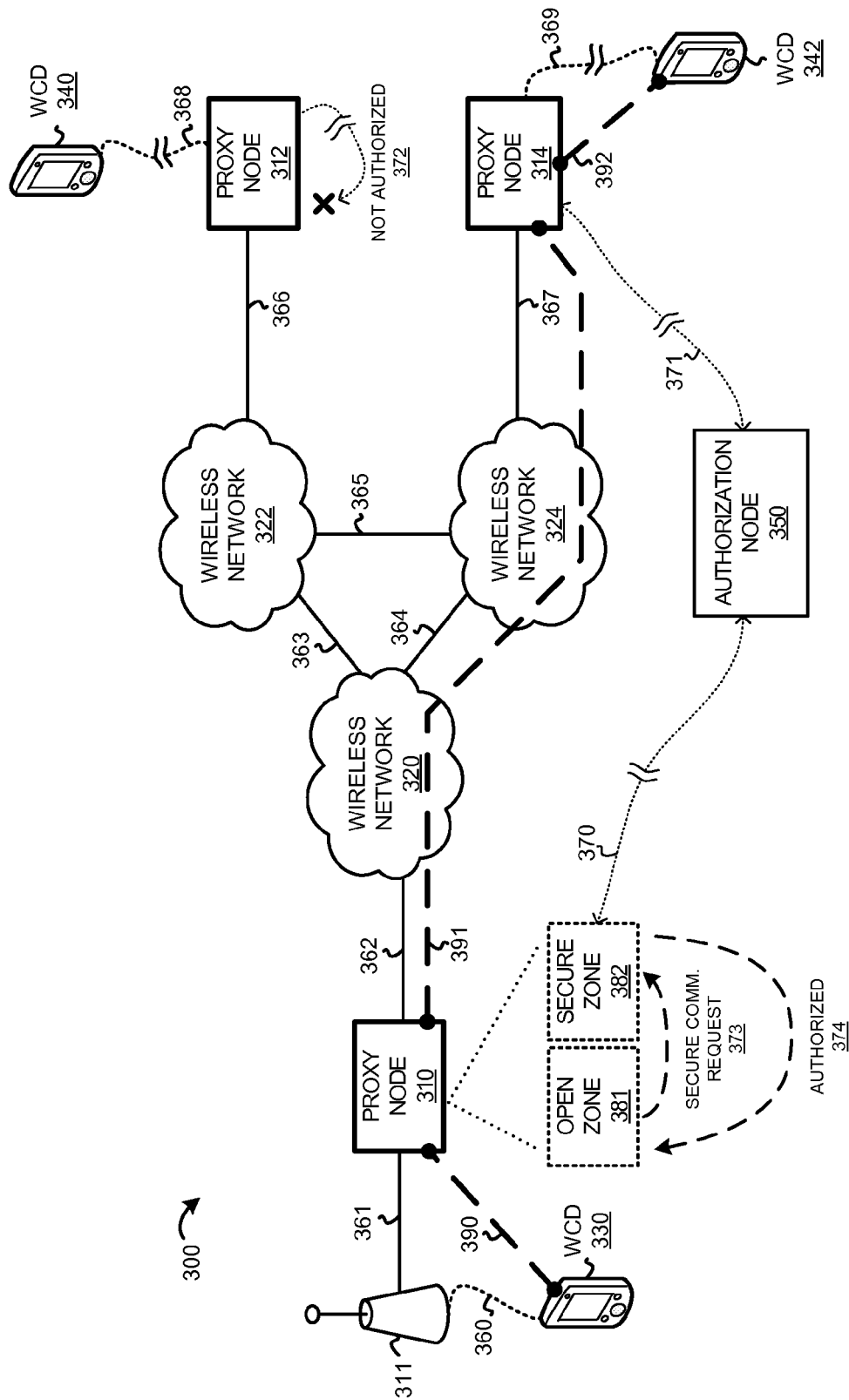
FIG. 3 is a system diagram illustrating a communication system.

As another example of a communication system, FIG. 3 is presented. FIG. 3 is a system diagram illustrating communication system 300. Communication system 300 includes proxy nodes 310, 312, and 314, wireless access node 311, wireless communication devices (WCD) 330, 340, and 342, wireless networks 320, 322, and 324, and authorization node 350.

WCD 330 and wireless access node 311 communicate over wireless link 360, which is a Long Term Evolution (LTE) cellular voice and data link in this example. Wireless access node 311 and proxy node 310 communicate over backhaul link 361, which is a T1 link in this example. Proxy node 310 and wireless network 320 communicate over link 362 which is an optical voice and data link in this example. Wireless networks 320, 322, and 324 each communicate over links 363-365 which are optical networking links in this example. Proxy node 312 and wireless network 322 communicate over optical voice and data link 366. Proxy node 312 and WCD 340 communicate over cellular voice and data link 368 which can include wireless access nodes, wireless and wired links, and other equipment omitted in FIG. 3 for clarity. Proxy node 314 and wireless network 324 communicate over optical voice and data link 367. Proxy node 314 and WCD 342 communicate over cellular voice and data link 369 which can include wireless access nodes, wireless and wired links, and other equipment omitted in FIG. 3 for clarity. Although authorization node 350 is not shown connected via any communication link in FIG. 3, it should be understood that authorization node 350 is communicatively coupled to any of wireless networks 320, 322, and 324, such as shown for link 144 in FIG. 1.

Each of wireless networks 320, 322, and 324 can be cellular voice and data networks for different service providers, such as cellular phone companies and the like, which communicate over interconnection links 363-365 for routing of voice calls, data sessions, text messages, and other communications between the various end user devices receiving wireless access to communication services via the associated wireless network. Each of wireless networks 320, 322, and 324 can include wireless access nodes distributed over a geographic area, such as base stations, as well as other equipment, including elements described for communication network 120 in FIG. 1.

Wireless access node 311 includes transceiver and antenna equipment to provide wireless access to communication services of wireless network 320 for wireless communication devices. Wireless access node 311 is included to show example wireless access equipment for wireless link 360. It should be understood that further wireless access nodes can be included in links 368 and 369.

Proxy nodes 310, 312, and 314 each comprise processing systems and routing equipment that can establish secure links with other proxy nodes and with associated end user devices, such as WCD 330. In some examples, proxy nodes 310, 312, and 314 are separate equipment or systems which perform as described herein. In other examples, proxy nodes 310, 312, and 314 are included in other systems or equipment of each associated wireless network, such as intermediary nodes, gateway nodes, packet gateways, routers, access service network gateways (ASN-GW), packet data switching nodes (PDSN), Mobility Management Entity (MME) equipment, serving gateways (SGW), PDN gateways (PGW), or other communications equipment of wireless communication networks.

Proxy node 310 also includes open zone 381 and secure zone 382. Each of these zones of proxy node 310 can be implemented in a separate microprocessor, microprocessor core, system-on-a-chip processor core, virtual core, or other hardware or software partition that separates memory spaces, operating systems, drivers, and other operational hardware and software elements so as to provide a restricted level of access for applications and users to secure zone 382, and a non-restricted level of access for open zone 381. In some examples, open zone 381 comprises a standard core of a processor system, such as for operating a Linux, Android, Windows, iOS, or other user-accessible operating system. Likewise, secure zone 382 comprises in some examples, a secure core or "trust zone" core of a processor system which prevents access to the processing and memory elements of secure zone 382 unless authorized through a security exchange or security handshake with authorization node 350. This partitioned configuration of secure zone 382 differs from user-level password protected access, in that any application that desires to execute on secure zone 382 must first be authorized by a security handshaking process with authorization node 350. Open zone 381 might run applications after a user merely "logs in" or passes a user-level security access, and the applications executed on open zone 381 are not authorized through a security handshaking process with authorization node 350. It should be understood that these partitions can be varied. In this example, proxy node 314 also includes an open zone and secure zone similar to that indicated for proxy node 310. In contrast, proxy node 312 does not include and open zone and secure zone similar to that indicated for proxy node 310.

WCD 330, 340, and 342 are smartphone devices in this example, and each can include one or more transceiver portions for communicating over wireless links using an associated wireless communication protocol, such as Long Term Evolution (LTE), Code Division Multiple Access (CDMA), or Global System for Mobile Communications (GSM) cellular voice and data links. It should be understood that any number and type of transceiver portions or transceiver types can be included in each of WCD 330, 340, and 342, including wired, wireless, optical, and other transceiver types using any associated communication protocol, frequencies, spectrum, and the like.

Authorization node 350 can include communication or network interfaces, as well as computer systems, microprocessors, circuitry, cloud-based systems, or some other processing devices or software systems, and can be distributed among multiple processing devices. Examples of authorization node 350 can also include software such as an operating system, logs, databases, utilities, drivers, networking software, and other software stored on a computer-readable medium.

Figure 4:
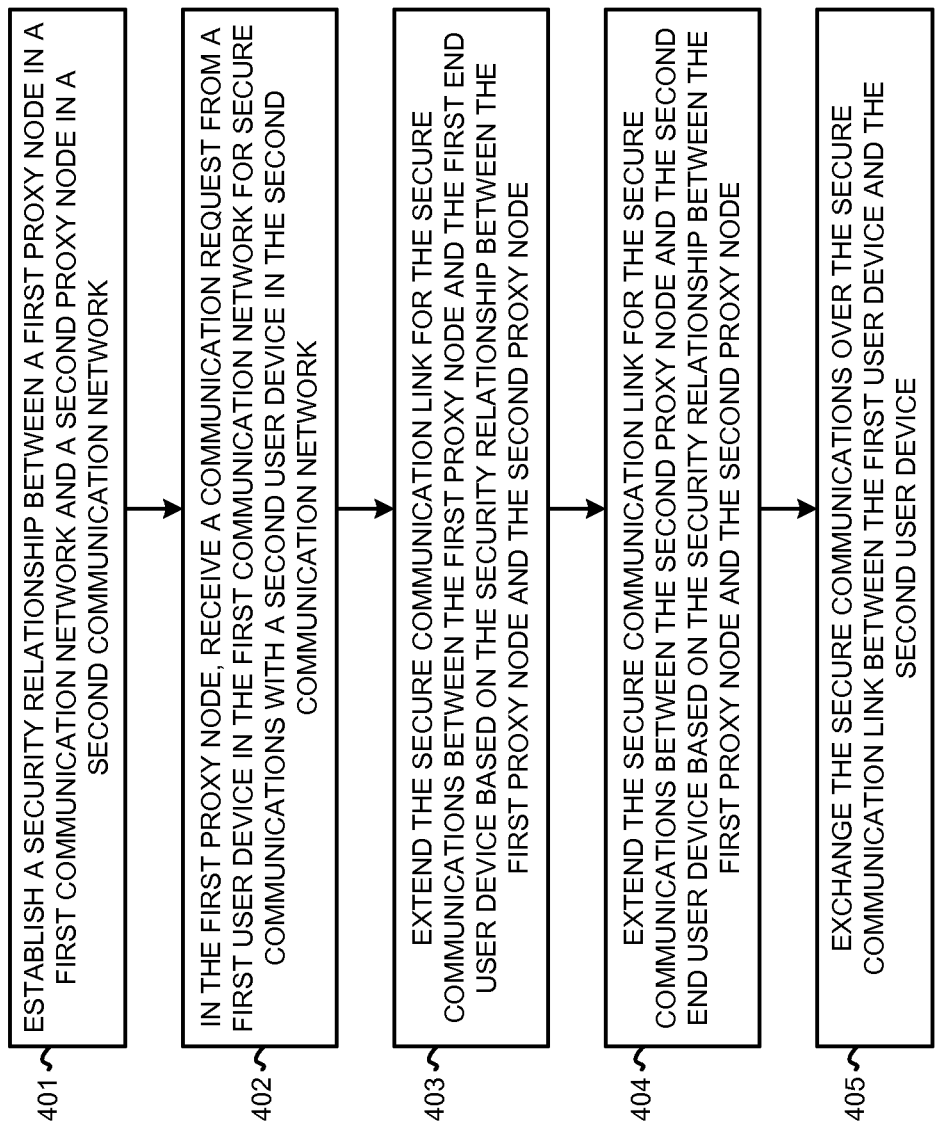
FIG. 4 is a flow diagram illustrating a method of operation of a communication system.

As an example operation of the elements of communication system 300, FIG. 4 is provided. FIG. 4 is a flow diagram illustrating a method of operation of communication system 300. The operations of FIG. 4 are referenced below parenthetically. In FIG. 4, proxy node 310 establishes (401) a security relationship between proxy node 310 in a first communication network and proxy node 314 in a second communication network. In this example, the first communication network is wireless network 320, and the second communication network is wireless network 324. The security relationship can be established for communications between proxy node 310 and proxy node 314 over the various interconnecting communication links and wireless networks shown in FIG. 3, as well as over other communication links and networks.

To establish the security relationship, both proxy node 310 and proxy node 314 participate in one or more authorization processes with authorization node 350. In FIG. 3, a first authorization process 370 occurs between proxy node 310 and authorization node 350, while a second authorization process 371 occurs between proxy node 314 and authorization node 350. Once both proxy node 310 and proxy node 314 are both authorized by authorization node 350, then proxy node 310 and proxy node 314 have established a security relationship. This security relationship can be used to establish secure communications over the various interconnecting communication links and wireless networks shown in FIG. 3, among other communication links and networks. For example, secure link 391 can be established over link 362, wireless network 320, link 364, wireless network 324, and link 367. In some examples, secure link 391 is a trusted communication link based on a mutual trust established by both proxy node 310 and proxy node 314 with authorization node 350. Although not required, secure link 391 can incorporate features of a virtual private network (VPN) link, secure sockets layer (SSL) link, or other encrypted link. However, in these examples, any associated encrypted link, such as a VPN link or SSL link, between proxy nodes 310 and 314 is comprised of endpoints authorized using secure zone security key-based authorization by authorization node 350, namely proxy nodes 310 and 314.

Authorization processes 370 and 371 can each include verifying or authenticating a hash result generated by the associated proxy node. Authentication process 370 will be discussed below, but it should be understood that a similar process can be performed for authentication process 371. In these examples, authentication process 370 can be initiated by proxy node 310 responsive to a communication request of WCD 330, or by open zone 381 seeking authentication or authorization for proxy node 310 to participate in secure communications. For example, secure communication request 372 can be transferred by open zone 381 to secure zone 382 responsive to a communication request received from WCD 330 or responsive to a desire by open zone 381 to initiate a security relationship with another proxy node. In other examples, authorization processes 370 and 371 can be initiated during a startup or power on process of the associated proxy nodes to establish a security relationship between the associated proxy nodes.

To authorize with authorization node 350, proxy node 310 can authenticate a hash result generated using at least a security key stored in secure zone 382. The hash result can be determined based on a cryptographic hash function. For example, a security key can be processed by a cryptographic hash function such as secure hash algorithm (SHA) or message digest algorithm (MD) to determine a cryptographic hash result which is used as the hash result discussed herein. Secure zone 382 can transfer the hash result during authorization process 370 for delivery to authorization node 350.

Responsive to authorization process 370, authorization node 350 processes the included hash result to authorize proxy node 310 to engage in secure communications. The hash result can be initially generated by secure zone 382 based on seed data, and authorization node 350 can process the hash result to determine if the hash result corresponds to the correct seed data originally used to generate the hash result. To authenticate or authorize the hash result, authorization node 350 can verify the hash result as a correct hash result, such as when a hash result might be tampered with or altered by an unauthorized system or user. In some examples, the seed data is first transferred by authorization node 350 and the seed data is processed using the security key by secure zone 382 to generate the hash result. If the hash result is authenticated or authorized, then authorization node 350 transfers a security grant message for delivery to proxy node 310. Secure zone 382 can indicate the authorization success to open zone 381 in authorization status message 373.

In yet further examples, in order for proxy node 310 and proxy node 314 to establish a security relationship for secure communications between each other, authorization node first must authorize both proxy node 310 and proxy node 314. For example, authorization process 370 can identify that proxy node 310 desires to establish a trust relationship with proxy node 314, and authorization process 372 can identify that proxy node 314 desires to establish a security relationship with proxy node 310. Authorization node 350 can identify that two proxy nodes desire to initiate a security relationship with each other, and responsively grant the trust relationship based on both proxy nodes properly authenticating an associated hash result. In one example, seed data comprising an identifier or identity of proxy node 314 can be used to generate the hash result used in authorization process 370, while seed data comprising an identifier or identity of proxy node 310 can be used to generate the hash result used in authorization process 371. The seed data can be processed by a security key stored in the respective secure zone of the associated proxy node to generate the hash result, as discussed herein. Once authorization node 350 determines the seed data based on the hash result, then authorization node 350 can determine the proxy node identified in the seed data, verify that the two proxy nodes have identified each other, and transfer security grant messages to each of proxy node 310 and proxy node 314 indicating that they both are authorized to participate in secure communications with each other.

Once proxy node 310 and proxy node 314 have been authorized by authorization node 350 and are permitted to participate in trusted or secure communications based on the security relationship, then further communications can be handled as secure communications by each proxy node for other devices communicating through the associated proxy node. In the process described in FIG. 4, WCD 330 desires to establish secure communications with WCD 342, even though WCD 330 and WCD 342 might not have a secure communication link initially established between themselves, and even though WCD 330 and WCD 342 might not have a security relationship initially established between themselves. However, WCD 330 is configured to communicate through proxy node 310, and WCD 342 is configured to communicate through proxy node 314.

Proxy node 310 receives (402) a communication request from a first user device in a first communication network for secure communications with a second user device in a second communication network. In this example, the first communication network includes at least wireless access node 311, proxy node 310, and wireless network 320. The second communication network includes at least proxy node 314 and wireless network 324. The second user device is WCD 342, and can be identified by WCD 330 using a phone number, network address, device number, or other device identifier. The communication request of WCD 330 can be initiated by a user of WCD 330 over a user interface presented by an application executed on WCD 330, such as a voice call application. The voice call application can include a phone dialer application, a voice over Internet Protocol (VoIP) application, a voice over Long Term Evolution (VoLTE) application, a voice over packet (VoP) application, or other communication application. Although a voice call is discussed in this example, it should be understood that a data session, text message, or other communication session can instead be employed.

Responsive to the communication request originating at WCD 330, and the security relationship with proxy node 314 already having been established, proxy node 310 extends (403) secure communication link 391 for the secure communications between proxy node 310 and WCD 330 based on the security relationship between proxy node 310 and proxy node 314. An additional leg of secure communication link 391 can be established as extended secure link 390 over at least link 361, wireless access node 311, and wireless link 360. Extending the security relationship can include identifying WCD 330 and allowing communication associated with WCD 330 to be transported over secure link 391. In other examples, WCD 330 might undergo a security key authorization process with authorization node similar to that performed for proxy node 310, where the security key of WCD 330 is stored in a secure zone of WCD 330. In yet other examples, secure communication link 390 is established using a VPN or SSL communication link between WCD 330 and proxy node 310, and due to the encryption or security measures of the VPN or SSL communication link, communications transferred by WCD 330 can be considered secure when transported by proxy node 310 over secure communication link 391. Other processes to extend secure communication link 391 over link 390 can be performed.

Responsive to the communication request identifying the destination device as WCD 342, and the security relationship with proxy node 314 already having been established, proxy node 310 or proxy node 314 extends (404) secure communication link 391 for the secure communications between proxy node 314 and WCD 342 based on the security relationship between proxy node 310 and proxy node 314. An additional leg of secure communication link 391 can be established as extended secure link 392 over at least link 368. Extending the security relationship can include identifying WCD 342 and allowing communication associated with WCD 342 to be transported over secure link 392 due to proxy node 314 being trusted by proxy node 310. In other examples, WCD 342 might undergo a security key authorization process with authorization node similar to that performed for proxy nodes 310 or 314, where the security key of WCD 342 is stored in a secure zone of WCD 342. In yet other examples, secure communication link 392 is established using a VPN or SSL communication link between WCD 342 and proxy node 314, and due to the encryption or security measures of the VPN or SSL communication link, communications transferred by WCD 342 can be considered secure when transported by proxy node 314 over secure communication link 391. Other processes to extend secure communication link 391 over link 392 can be performed.

Once secure link 391 has been extended to include secure link 390 and secure link 392, then WCD 330, proxy node 310, proxy node 314, and WCD 342 exchange (405) the secure communications over secure communication link 390-391-392 between WCD 330 and WCD 342. The communications can include a voice call, and thus the voice call can occur over a secure communication link between WCD 330 and WCD 342. In other examples, the communications can include data exchange, and thus the data exchange can occur over a secure communication link between WCD 330 and WCD 342.

In FIG. 4, a direct security relationship between WCD 330 and WCD 342 is not established to engage in secure communications. For example, although a VPN or SSL link can be established by WCD 330 and WCD 342 on top of secure communication link 390-391-392, a VPN or SSL relationship between these WCD endpoints need not be established to ensure a secure communication link. Proxy node 310 can trust WCD 342 to engage in secure communications over secure communication link 390-391-392 based at least upon the security relationship between proxy node 310 and proxy node 314.

WCD 330 and WCD 342 might not include secure zones in many examples, and likewise might not include security keys or hash results that are authorized by authorization system 350. However, proxy node 310 and proxy node 314 establish a security relationship based on associated security keys stored in their secure zones, and this security relationship can be extended to an associated WCD or other user device by the associated proxy node. In FIG. 3, proxy node 312 does not have a security relationship established with proxy node 310, and thus a secure communication link is not established between proxy node 310 and proxy node 312, as indicated by "not authorized" designation 372. A secure communication link cannot also be extended by proxy node 312 to WCD 340, since a security relationship is not established between proxy node 310 and proxy node 312. If WCD 330 attempts to establish a secure communication session with WCD 340, proxy node 310 can deny any secure communication link or secure communications.

Figure 5:
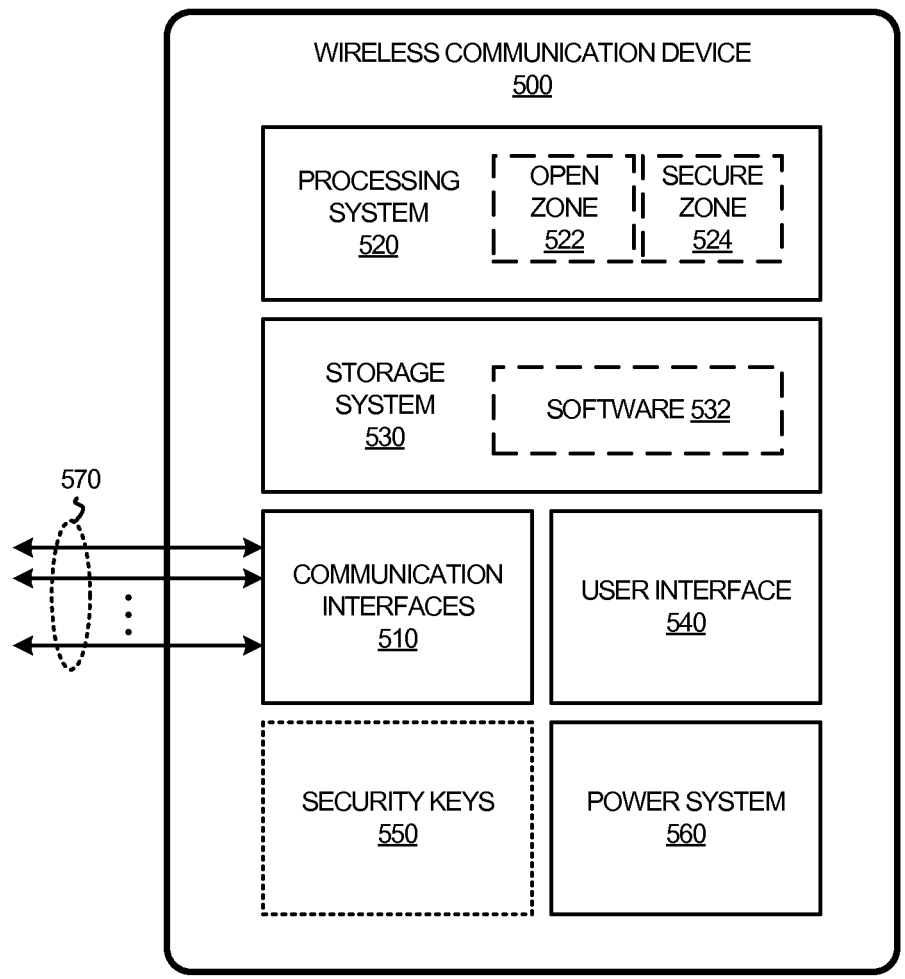
FIG. 5 is a block diagram illustrating a wireless communication device.

FIG. 5 is a block diagram illustrating wireless communication device 500, as an example of user device 130 found in FIG. 1 or WCD 330 found in FIG. 3, although variations are possible. Wireless communication device 500 includes communication interfaces 510, processing system 520, storage system 530, user interface 540, security keys 550, and power system 560.

Communication interface 510, processing system 520, storage system 530, user interface system 540, and power system 560 are communicatively coupled, and can communicate over associated discrete links, common busses, data links, power links, RF links, or other links. Wireless communication device 500 can be distributed or consolidated among equipment or circuitry that together forms the elements of wireless communication device 500. Wireless communication device 500 can optionally include additional devices, features, or functionality not discussed here for purposes of brevity.

Communication interface 510 comprises one or more communication transceiver circuitry portions and communication interface circuitry for communicating over one or more communication links 570 with one or more communication networks. In some examples, communication interface 510 includes wireless transceiver circuitry and antenna equipment for communicating with base stations of a cellular voice and data network, among other communication networks. Communication interface 510 could include transceiver equipment and antenna elements for wirelessly exchanging user communications and overhead communications over the associated ones of links 570, among further links. Communication interface 510 also receives command and control information and instructions from processing system 520 or user interface system 540 for controlling the operations of communications over links 570. Links 570 could each use various protocols or communication formats as described herein for links 140-141, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

In this example, processing system 520 includes open zone 522 and secure zone 524. Each zone of processing system 520 can be implemented in a separate microprocessor, microprocessor core, virtual core, or other hardware or software partition that separates memory spaces, operating systems, drivers, and other operational hardware and software elements so as to provide a restricted level of access for applications and users to secure zone 524, and a non-restricted level of access for open zone 522. In some examples, open zone 522 comprises a standard core of a processor system, such as for operating an Android, Windows, iOS, or other user-accessible operating system. Likewise, secure zone 524 comprises in some examples, a secure core or "trust zone" core of a processor system which prevents access to the processing and memory elements of secure zone 524 unless authorized through a security exchange or security handshake with an external authorization node.

This partitioned configuration of secure zone 524 differs from user-level password protected access, in that any application that desires to execute on secure zone 524 must first be authorized by a security handshaking process with an external authorization node. Whereas open zone 522 might run applications after a user merely "logs in" or passes a user-level security access, and the applications executed on open zone 522 are not authorized through a security handshaking process with an authorization node.

Storage system 530 can comprise any computer readable storage media or storage device readable by processing system 520 and capable of storing software 532. In some examples, portions of storage system 530 stores security keys 550. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 or other data can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by wireless communication device 500 in general or processing system 520 in particular, direct wireless communication device 500 or processing system 520 to transfer a communication request for secure communications, engage in authorization processes with authorization nodes or systems, and exchange communications over secure communication links, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to transfer a communication request for secure communications, engage in authorization processes with authorization nodes or systems, and exchange communications over secure communication links.

In general, software 532 can, when loaded into processing system 520 and executed, transform processing system 520 overall from a general-purpose computing system into a special-purpose computing system customized to transfer a communication request for secure communications, engage in authorization processes with authorization nodes or systems, and exchange communications over secure communication links, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface system 540 includes equipment and circuitry for receiving user input and control, such as for engaging in voice calls or data sessions, and receiving user instructions for text or video messages, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface system 540 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Security keys 550 comprise one or more security keys, such as those discussed herein. Security keys 550 can be encryption keys, pseudorandom keys, private keys, or other security keys. Security keys 550 are stored in a data structure, which can be a sub-portion of storage system 530 accessible only by secure zone 524. In some examples, a separate physical storage device or memory device is employed to store security keys 550 and make available security keys 550 to secure zone 524 and not to open zone 522. In other examples, security keys 550 are stored in a shared memory space or memory device and accessible only by secure zone 524. Security keys 550 can be hard coded during manufacture of wireless communication device 500, such as by including security keys 550 in programmable read-only memory elements.

Power system 560 includes circuitry and a power source to provide power to the elements of wireless communication device 500. The power source could include a battery, solar cell, flywheel, capacitor, thermoelectric generator, chemical power source, dynamo, or other power source. In some examples, power system 560 receives power from an external source, such as a wall outlet or power adapter. Power system 560 also includes circuitry to condition, monitor, and distribute electrical power to the elements of wireless communication device 500.

Figure 6:
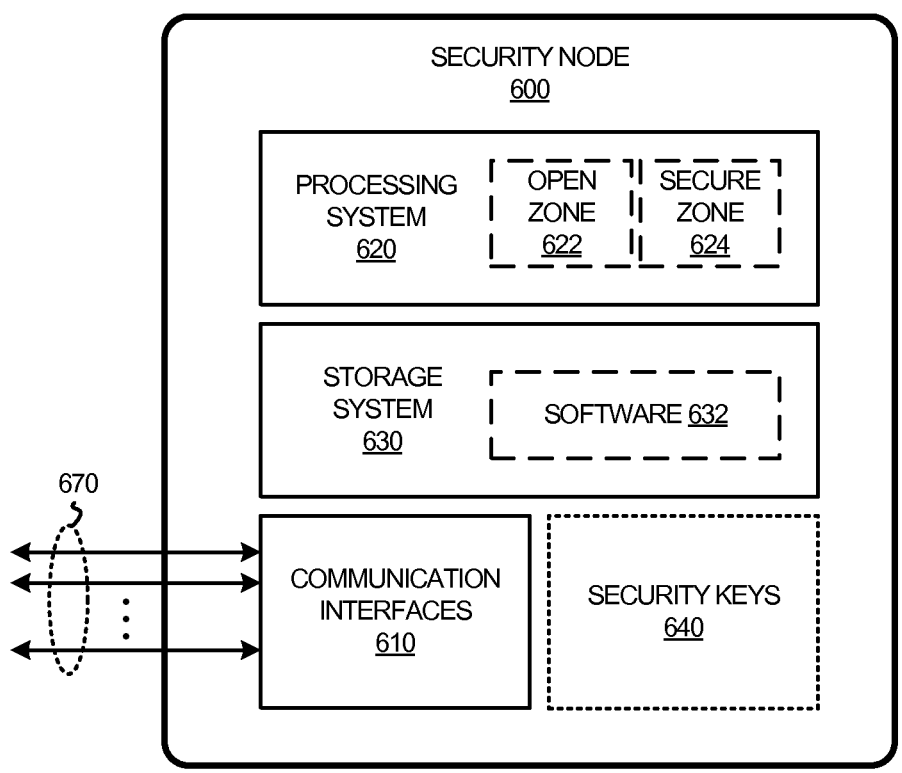
FIG. 6 is a block diagram illustrating a security node.

FIG. 6 is a block diagram illustrating security node 600, as an example of security nodes 110, 112 found in FIG. 1 or proxy nodes 310, 314 found in FIG. 3, although variations are possible. Security node 600 includes communication interfaces 610, processing system 620, storage system 630, and security keys 640.

Communication interfaces 610, processing system 620, and storage system 630 are communicatively coupled, and can communicate over associated discrete links, common busses, data links, power links, RF links, or other links. Security node 600 can be distributed or consolidated among equipment or circuitry that together forms the elements of security node 600. Security node 600 can optionally include additional devices, features, or functionality not discussed here for purposes of brevity.

Communication interfaces 610 comprise one or more communication transceiver circuitry portions and communication interface circuitry for communicating over one or more communication links 670 with one or more communication networks. Communication interface 610 could include transceiver equipment and routing equipment for exchanging communications over associated ones of links 670, among further links. In some examples, communication interface 610 includes wireless transceiver circuitry and antenna equipment. Communication interface 610 also receives command and control information and instructions from processing system 620 for controlling the operations of communications over links 670. Links 670 could each use various protocols or communication formats as described herein for links 140-144, including combinations, variations, or improvements thereof.

Processing system 620 can comprise one or more microprocessors and other circuitry that retrieves and executes software 632 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

In this example, processing system 620 includes open zone 622 and secure zone 624. Each zone of processing system 620 can be implemented in a separate microprocessor, microprocessor core, virtual core, or other hardware or software partition that separates memory spaces, operating systems, drivers, and other operational hardware and software elements so as to provide a restricted level of access for applications and users to secure zone 624, and a non-restricted level of access for open zone 622. In some examples, open zone 622 comprises a standard core of a processor system, such as for operating an Android, Linux, Windows, iOS, embedded operating system, or other user-accessible operating system. Likewise, secure zone 624 comprises in some examples, a secure core or "trust zone" core of a processor system which prevents access to the processing and memory elements of secure zone 624 unless authorized through a security exchange or security handshake with an external authorization node.

This partitioned configuration of secure zone 624 differs from user-level password protected access, in that any application that desires to execute on secure zone 624 must first be authorized by a security handshaking process with an external authorization node. Whereas open zone 622 might run applications after a user merely "logs in" or passes a user-level security access, and the applications executed on open zone 622 are not authorized through a security handshaking process with an authorization node.

Storage system 630 can comprise any computer readable storage media or storage device readable by processing system 620 and capable of storing software 632. In some examples, portions of storage system 630 stores security keys 640. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 632 or other data can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 632 can be implemented in program instructions and among other functions can, when executed by security node 600 in general or processing system 620 in particular, direct security node 600 or processing system 620 to receive communication requests from user devices for secure communications with other user devices, become authorized to engage in the secure communications by an authorization node, establish secure communication links between end user devices, determine if other security nodes have a security relationship established with security node 600, establish secure communication links for secure communications between end user devices, using at least the security relationship between security node 600 and another security node, and exchange secure communications over secure communication links, among other operations. Software 632 can include additional processes, programs, or components, such as operating system software, database software, or application software. Software 632 can also comprise firmware or some other form of machine-readable processing instructions executable by processing system 620.

In at least one implementation, the program instructions can include first program instructions that direct processing system 620 to receive communication requests from user devices for secure communications with other user devices, become authorized to engage in the secure communications by an authorization node, establish secure communication links between end user devices, determine if other security nodes have a security relationship established with security node 600, establish secure communication links for secure communications between end user devices, using at least the security relationship between security node 600 and another security node, and exchange secure communications over secure communication links.

In general, software 632 can, when loaded into processing system 620 and executed, transform processing system 620 overall from a general-purpose computing system into a special-purpose computing system customized to receive communication requests from user devices for secure communications with other user devices, become authorized to engage in the secure communications by an authorization node, establish secure communication links between end user devices, determine if other security nodes have a security relationship established with security node 600, establish secure communication links for secure communications between end user devices, using at least the security relationship between security node 600 and another security node, and exchange secure communications over secure communication links, among other operations. Encoding software 632 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 632 can transform the physical state of the semiconductor memory when the program is encoded therein. For example, software 632 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Security keys 640 comprise one or more security keys, such as those discussed herein. Security keys 640 can be encryption keys, pseudorandom keys, private keys, or other security keys. Security keys 640 are stored in a data structure, which can be a sub-portion of storage system 630 accessible only by secure zone 624. In some examples, a separate physical storage device or memory device is employed to store security keys 640 and make available security keys 640 to secure zone 624 and not to open zone 622. In other examples, security keys 640 are stored in a shared memory space or memory device and accessible only by secure zone 624. Security keys 640 can be hard coded during manufacture of security node 600, such as by including security keys 640 in programmable read-only memory elements.

Referring back to FIG. 1, security nodes 110, 112 each comprises computer processing systems, routing equipment, communication interfaces, and other equipment to establish communication sessions, communication links, secure communication links, and trust relationships, among other operations. Security nodes 110, 112 can each include communication or network interfaces, as well as computer systems, microprocessors, circuitry, cloud-based systems, or some other processing devices or software systems, and can be distributed among multiple processing devices. Examples of security nodes 110, 112 can also each include software such as an operating system, logs, databases, utilities, drivers, networking software, and other software stored on a computer-readable medium. In some examples, security nodes 110, 112 each comprise proxy nodes, intermediary nodes, gateway nodes, packet gateways, routers, access service network gateways (ASN-GW), packet data switching nodes (PDSN), Mobility Management Entity (MME) equipment, or other communications equipment of wireless communication networks.

Communication network 120 comprises communication and control systems for providing access to communication services for other devices and networks. Communication network 120 can each provide communication services including communication routing, link bridging, network communications, data exchange, or other communication services. In some examples, communication network 120 is a cellular voice and data network that can provide voice calls, text messages, data access, or other communication services provided over cellular or wireless communication networks. In some examples, communication network 120 includes equipment to provide wireless access to communication services within different coverage areas to user devices, route communications between content providers and user devices, and facilitate handoffs between equipment of different coverage areas, among other operations. Communication network 120 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

User device 130 comprises a processing system, a plurality of transceiver portions, security keys, user interface elements, and other communication elements. The transceiver portions typically include amplifiers, filters, modulators, and signal processing circuitry. The transceiver portions can be used to communicate over link 140, which can include wired, optical, or wireless links. The processing system can include one or more processing portions. User device 130 can also include user interface systems, memory devices, non-transitory computer-readable storage mediums, software, processing circuitry, or some other communication components. User device 130 can be a user device, user equipment, subscriber equipment, customer equipment, access terminal, wireless smartphone, computer, mobile Internet appliance, wireless network interface card, media player, game console, or some other communication apparatus, including combinations thereof. User device 132 can comprise similar elements as described for user device 130.

Communication links 140-144 each use metal, glass, optical, air, space, or some other material as the transport media. Communication links 140-144 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication links 140-144 can each be a direct link or can include intermediate networks, systems, or devices, and can include a logical network link transported over multiple physical links. Communication links 140-144 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

In some examples, communication links 140 and 143 are wireless links, and use the air or space as the transport media. Wireless links 140 and 143 each comprises one or more wireless communication links provided over an associated wireless frequency spectrum or wireless frequency band, and can use various protocols. In this example, wireless links 140 and 143 can comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140-144 is shown in FIG. 1, it should be understood that links 140-144 are merely illustrative to show communication modes or access pathways for user device 130 and user device 132. In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system to establish a secure communications between a first user device in a first communication network and a second user device in a second communication network, the method comprising:

a first security node in the first communication network hashing a first node security key to generate a first node hash result and transferring the first node hash result for delivery to an authorization system, wherein the first security node comprises hardware and software elements;

a second security node in the second communication network hashing a second node security key to generate a second node hash result and transferring the second node hash result for delivery to the authorization system, wherein the second security node comprises hardware and software elements;

the first user device in the first communication network hashing a first device security key to generate a first device hash result and transferring the first device hash result for delivery to the authorization system, wherein the first user device comprises hardware and software elements;

the second user device in the second communication network hashing a second device security key to generate a second device hash result and transferring the second device hash result for delivery to the authorization system, wherein the second user device comprises hardware and software elements;

the authorization system receiving and validating the first node hash result and the second node hash result to establish a node-to-node secure link to conduct secure zone communication between the first security node and the second security node, wherein validating the first node hash result comprises processing the first node hash result to determine if the first node hash result was generated using correct seed data that includes the first node security key and wherein validating the second node hash result comprises processing the second node hash result to determine if the second node hash result was generated using correct seed data that includes the second node security key;

the authorization system receiving and validating the first device hash result to establish a first device-to-node secure link to conduct the secure zone communication between the first user device and the first security node, and receiving and validating the second device hash result to establish a second device-to-node secure link to conduct the secure zone communication between the second user device and the second security node wherein validating the first device hash result comprises processing the first device hash result to determine if the first device hash result was generated using correct seed data that includes the first device security key and wherein validating the second device hash result comprises processing the second device hash result to determine if the second device hash result was generated using correct seed data that includes the second device security key;

the authorization system receiving a communication request for the secure communications between the first user device and the second user device, and in response, identifying the first device-to-node secure link, identifying the node-to-node secure link, and identifying the second device-to-node secure link; and wherein conducting the secure zone communication comprises utilizing a secure core system of the first and second security nodes to restrict access to processing and memory elements of the devices and nodes only when authorized through the secure link established with the authorization system;

the authorization system granting the communication request for the secure communications if the first device-to-node secure link, the node-to-node secure link, and the second device-to-node secure link are identified.

2. The method of claim 1 wherein the first device security key was hard-coded into the first user device at manufacture.

3. The method of claim 1 wherein the first node security key was hard-coded into the first security node at manufacture.

4. The method of claim 1 further comprising the authorization system transferring a request for delivery to the second user device to establish the second device-to-node secure link if the second device-to-node secure link is not identified.

5. The method of claim 1 further comprising the authorization system transferring a request for delivery to the second security node to establish the node-to-node secure link if the node-to-node secure link is not identified.

6. The method of claim 1 wherein the first user device comprises a wireless communication device.

7. The method of claim 1 wherein the first user device comprises a Long Term Evolution (LTE) device.

8. The method of claim 1 wherein the first user device and the second user device comprise Long Term Evolution (LTE) devices.

9. The method of claim 1 wherein the first security node comprises a Long Term Evolution (LTE) Packet Gateway (P-GW).

10. The method of claim 1 wherein the first security node and the second security node comprise Long Term Evolution (LTE) Packet Gateways (P-GWs).

* * * * *